US012645706B1

(12) United States Patent
Li et al.

(10) Patent No.: US 12,645,706 B1
(45) Date of Patent: Jun. 2, 2026

(54) MODULAR THREAD ANALYTICS EXPLORATION FOR EXTRAPOLATING REASONS FROM COMPLEX DATABASE

(71) Applicant: Amazon Technologies, Inc., Seattle, WA (US)

(72) Inventors: Hanbo Li, Seattle, WA (US); Sheng Zhang, New Jersey, NJ (US); Patrick Ng, Great Neck, NY (US); ChungWei Hang, South Orange, NJ (US); Stephen Michael Ash, Seattle, WA (US); Mingwen Dong, Stony Brook, NY (US); William Michael Siler, Germantown, TN (US); Chris Elliott, Bainbridge Island, WA (US); Shannon Kalisky, Dripping Springs, TX (US); Afrooz Samaei, Etobicoke (CA); Gregory David Adams, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 19/096,460

(22) Filed: Mar. 31, 2025

Related U.S. Application Data

(60) Provisional application No. 63/727,620, filed on Dec. 3, 2024.

(51) Int. Cl.
*G06F 16/28* (2019.01)
*G06F 16/242* (2019.01)

(52) U.S. Cl.
CPC .......... *G06F 16/287* (2019.01); *G06F 16/243* (2019.01); *G06F 16/283* (2019.01)

(58) Field of Classification Search
None
See application file for complete search history.

(56) References Cited

U.S. PATENT DOCUMENTS

| | | | | |
|---|---|---|---|---|
| 2015/0378987 A1* | 12/2015 | Sekar | ...................... | G06F 16/30 704/9 |
| 2018/0210883 A1* | 7/2018 | Ang | ...................... | G06F 40/284 |
| 2020/0285704 A1* | 9/2020 | Rajani | ...................... | G06N 3/09 |

* cited by examiner

*Primary Examiner* — Eddy Cheung
(74) *Attorney, Agent, or Firm* — Knobbe, Martens, Olson & Bear, LLP

(57) ABSTRACT

A graphical user interface receives natural language input from a user. A modular thread analytics exploration system uses context determination, dynamic context enrichment, and the natural language input to generate a solution recipe with a language model. The system prompt the language model with evaluation guides to improve the accuracy of the model output. The solution recipe includes steps (i) that are used to generate code and (ii) that are used to generate natural language explanations. The system generates code with a language model. The system processes the generated code in a sandbox and self-debugs the generated code as necessary. The output from the steps is presented in the graphical user interface.

20 Claims, 7 Drawing Sheets

MODULAR THREAD ANALYTICS EXPLORATION FOR EXTRAPOLATING REASONS FROM COMPLEX DATABASE

INCORPORATION BY REFERENCE TO ANY PRIORITY APPLICATIONS

This application claims benefit of U.S. Provisional Patent Application Ser. No. 63/727,620 entitled "MODULAR THREAD ANALYTICS EXPLORATION FOR EXTRAPOLATING REASONS FROM COMPLEX DATABASE" filed on Dec. 3, 2024, which is hereby incorporated by reference in its entirety.

Any and all applications for which a foreign or domestic priority claim is identified in the Application Data Sheet as filed with the present application are hereby incorporated by reference under 37 CFR 1.57.

BACKGROUND

Business intelligence (BI) platform is a technology system that allows enterprise organizations to perform information retrieval and analysis on complex data structures and database systems. BI platforms incorporate a collection of software tools that can visually present relationships using data from multiple sources (e.g., create a bar graph using a set of targeted data sources).

BRIEF DESCRIPTION OF THE DRAWINGS

These and other features, aspects and advantages are described below with reference to the drawings, which are intended for illustrative purposes and should in no way be interpreted as limiting the scope of the embodiments. Furthermore, various features of different disclosed embodiments can be combined to form additional embodiments, which are part of this disclosure. In the drawings, like reference characters can denote corresponding features throughout similar embodiments. The following is a brief description of each of the drawings.

DETAILED DESCRIPTION

Figure 1:
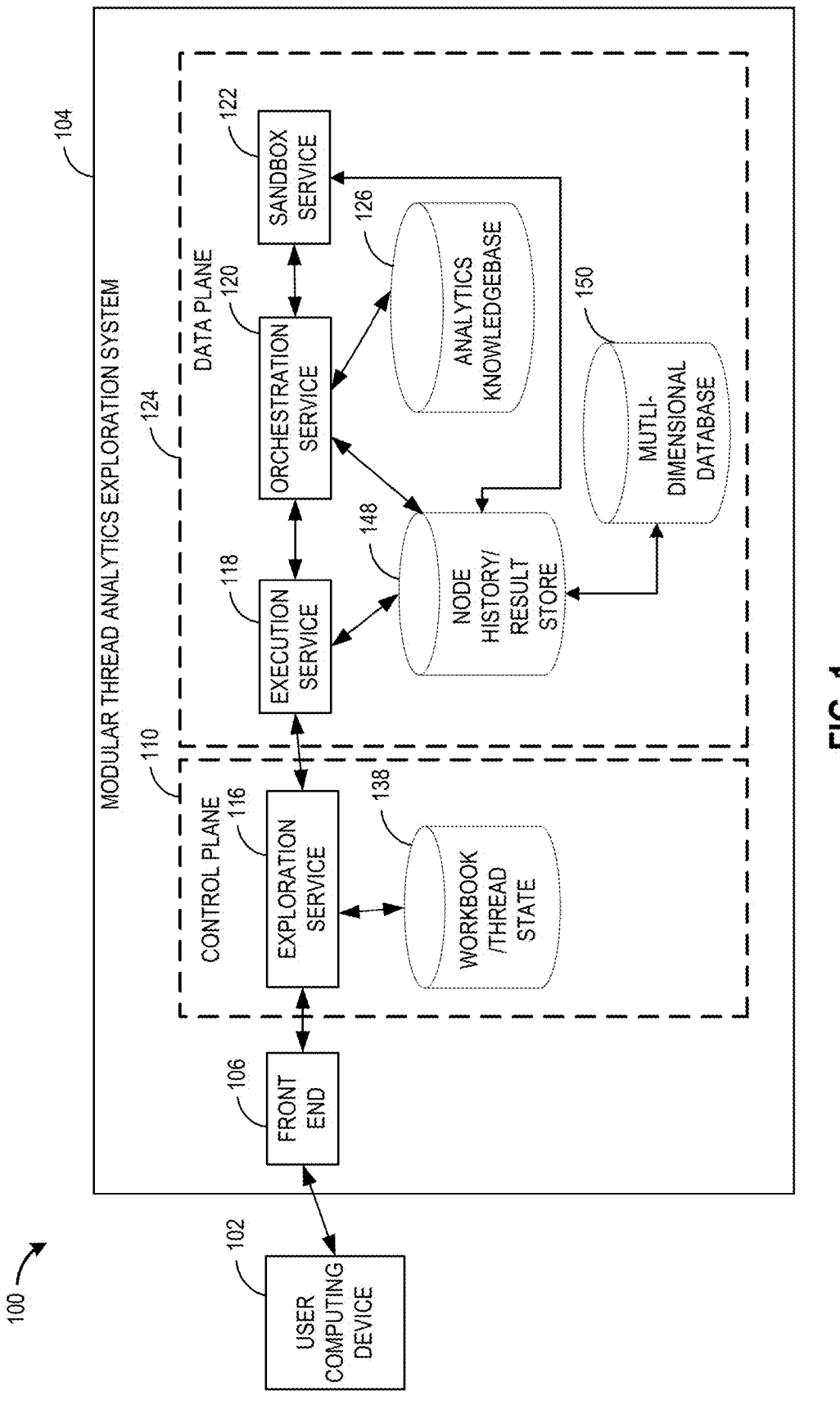
FIG. 1 is a schematic block diagram depicting an illustrative environment including a modular thread analytics exploration system that can implement information extrapolation from a multi-dimensional database.

Older BI platforms require developers to create the tools that allow non-technical users to perform data analysis in a structured format. Thus, non-technical users are reliant on technical users to create new data analysis tools and channels before they can explore data in a new way. Current BI platforms take advantage of natural language processing (e.g., by using AI models) to enable users to explore their data interactively. In this process, users may travel through their data using questions one step at a time, refining or expanding their questions, uncovering new information, zeroing in on details, or zooming out for a broader view. However, the exploration/interactions using natural language processing are limited to deducing "what" is in the data repository. For example, when a user asks, "top geographic states by total units YTD," current BI platforms can output a graphical representation (e.g., on a map) of units in each state (e.g., using color or different size circles in each state to reflect different amount of "units" year to date). Current BI platforms may even propose follow up questions such as "what are top districts by total unit," to help the user expand their question. But current BI platforms lack the ability to explore "why" and "what if" types of natural language questions/queries because these questions are ambiguous (i.e., the platform cannot provide a definitive answer based on "what" is in the repository.) For example, when asked "why sales units of region X has gone down in last quarter," current BI platforms may return sales units of region X (and maybe the surrounding regions as well) over a specified time, but it would be up to the user to determine whether any reason can be deduced from the output. Current BI platforms also have no ability to help users explore other potential contributing factors with respect to the "why".

Large language models (LLM) have been used to perform data analysis. But incorporating a LLM model into a BI platform to address the "why" type (and "what-ifs") of questions comes with many technological challenges. For example, the speed to return a quality answer is a challenge (in the field, it is sometimes called a latency issue). To address "why", the LLM model would need to learn the whole enterprise data repository. By the time, it learned the whole data repository, formulated an answer, and outputting the answer in a correct format, the latency would be too high. And if the answer is not satisfactory, the user will refuse to interact with the platform again given the time penalty. Second, LLM models are known to hallucinate, both with respect to treating the input prompt and providing the output. For example, when asking "why sales units of region X has gone down in last quarter", the LLM may infer that "has gone down" means reduction in the absolute sales number when the user intended to be with "respect to the seasonal pattern." Also, because BI platform houses a large amount of similarly-labeled data, the LLM's output may hallucinate based on data in a wrong dataset when the data it needs are actually stored in a different structure that LLM did not get trained on. Even a domain-trained LLM faces a variation of challenges mentioned above because enterprise data platform (e.g., BI platform) have a large amount of data changing event daily. Hence, embodiments of the present disclosure generally address the technical challenges risen from seeking structured reasonings/projections from a complex data query platform (such as business intelligence platform) with high reliability and/or reduced latency.

Generally described, aspects of the present disclosure are directed towards solutions for modular thread analytics exploration and/or extrapolation of information from a complex database. Extrapolation can include discovery of new insights based on data analytics. In some embodiments, a user can begin by uploading data to a database or using existing data in a database. A graphical user interface can receive natural language input from a user. For example, a user can provide the following natural language input: "What drove the decrease in page views over the past 2 weeks?" In response, a modular thread analytics exploration system is generated to suggest one or more exploration options, such as, "Show the referral traffic over the last two weeks" or "Show the campaigns from the last two weeks." If a user selects an exploration option or provides their own natural language instruction, then the modular thread analytics exploration system can process the input and provide output. The modular thread analytics exploration system can advantageously use context, dynamic context, enrichment, and the natural language input to generate a solution recipe with artificial intelligence ("AI") and language models. In some embodiments, before a solution recipe is generated, the language model can be prompted with an evaluation guide to improve the accuracy of the model output. The solution recipe can include (i) exploration steps for generating code and (ii) exploration steps for generating natural language explanations. The system generates code with a language model. The modular thread analytics exploration system can process the generated code in a sandbox and self-debug the generated code as necessary. The output from the exploration steps can be presented in the graphical user interface. The presented output can include visualizations, such as, but not limited to, graphs, charts, etc. In some embodiments, the modular thread analytics exploration system can update the remaining exploration steps of the solution recipe with reflection. The modular thread analytics exploration system can process the solution recipe in loops with prompts, context, dynamic context enrichment, and/or thread history to continue improving the solution recipe and data analyses.

As used herein, a "solution recipe" can refer to a solution to a problem that includes an ordered list of exploration steps in natural language. The exploration steps, in combination, represent an analytical path configured to deduce rationales from one or more associations in a multi-dimensional database. Each exploration step can represent a reasoned chain in a layered information extraction process. As described herein, a language model can generate solution recipes. In some embodiments, each exploration step of the solution recipe can either be an explanation step or a code-generation step. The language model can output each exploration step of the solution recipe with a tag indicating the type of exploration step, such as, but not limited to, being an explanation step or a code-generation step. Non-limiting solution recipes are described further herein, such as with respect to Tables 4 and 5.

As used herein, a "data analytics exploration tree" can refer to a data representation of the graphical user interface elements/analytical path described herein. Visual representations of data analytics exploration trees are shown and described herein, such as with respect to FIGS. 5A-5C. The data analytics exploration tree can include a root node with child nodes. A node can refer to an interaction with the modular thread analytics exploration system. A common node can be a combination of a user's query (such as natural language input) and the modular thread analytics exploration system's response, which can be shown as a panel in the graphical user interface. An analytical path in the data analytics exploration tree can refer to a line of parent-child nodes. A branch can refer to a fork in a thread where a single parent node has multiple children blocks. Retrieving deeper layers of information can include branching. A linear data analytical path from parent-to-child nodes can form the primary "context" for new nodes in a thread. An example of a branch would be when a user has a thread with exploration step (A)—grouping sales data by region and product category and two branches: (B) filtering to only North America sales by region and category, and (C) filtering to only EU sales by region and category. The data analytics exploration tree can be represented with a data structure. The data analytics exploration tree can be or correspond to a directed acyclic graph.

As discussed above, typical foundational AI models were unable to perform the accurate analytics against an complex database query platform—i.e. to deduce quality patterns/associations and output reasonings/projections based on the patterns/associations. Embodiments of the present disclosure utilize a combination of mechanisms, for example, the use of solution recipes, dynamic code generation, self-debug capabilities, the reflection processes, and evaluation guides (such as a series of questions) to enable complex query data platforms to perform causation-like reasoning exploration that goes beyond simply identifying relationships deducible from an enterprise database.

Existing foundational AI models and embodiments described herein evaluated with a quantitative reasoning benchmark. The benchmark included complex questions (such as hundreds of questions), each based on data (such as tabular or CSV) and accompanied by two primary labels: question format (Multiple Choice Question or Numerical) and analytical approach (Statistical or Causal). Beyond these broad categories, the data set incorporated fine-grained tags that further specify question types, such as probability-based inquiries or those related to Chi-square tests. This detailed categorization enabled precise assessment of various quantitative reasoning skills. Each question was annotated with a concise answer. For Multiple Choice Questions, responses were denoted by single letters (e.g., 'A', 'B', 'C') or simple affirmatives/negatives ('yes', 'no'). Numerical questions have a specific numerical value as the answer. The answer was evaluated with string match. Each of the question types (Multiple Choice, Numerical, Statistical, and Causal) and answers were averaged to determine an overall accuracy score. Embodiments of the present disclosure outperform existing foundational models based on accuracy.

Complex data query platform that simply integrates existing foundational AI models performs worse in answering reasoning questions (such as Multiple Choice, Numerical, Statistical, and Causal) when compared to the performance of the embodiments of the present disclosure to answer the same questions. In some embodiments, combinations of one or more of dynamic content enrichment, turn-based whole plan modification, and recipe evaluation assessment mechanisms increases the answer accuracy to the reasoning questions substantially while maintaining a reasonable response time latency.

FIG. 1 is a schematic block diagram depicting an illustrative environment 100 including a modular thread analytics exploration system 104 that can implement information extrapolation from a multi-dimensional database 150. In particular, the modular thread analytics exploration system 104 can enable generation of structured reasonings/projections from the multi-dimensional database 150 with high reliability and/or reduced latency. The environment 100 can include a user computing device 102 and a modular thread analytics exploration system 104. The modular thread analytics exploration system 104 can include a front end 106, a control plane 110, and a data plane 124. The control plane 110 can include an exploration service 116 and workbook/thread state 138.

A user can, via the user computing device 102, access the front end 106. The front end 106 can provide the graphical user interfaces described herein, such as the graphical user interfaces 500 of FIGS. 5A, 5B, 5C. In some embodiments, the user computing device 102 can include a browser application that can be used to interact with the graphical user interfaces of the modular thread analytics exploration system 104. User computing devices 102 can include, but are not limited to, a laptop or tablet computer, personal computer, personal digital assistant ("PDA"), hybrid PDA/ mobile phone, mobile phone, and/or a smartphone. As described herein, a user can interact with the graphical user interfaces with natural language input. The front end 106 can receive user input, such as selections of user interface elements and natural language input.

The front end 106 can communicate with the exploration service 116. The exploration service 116 can be responsible for managing state with the workbook/thread state 138. For example, a user can create a new workbook and create one or more threads that include natural language input. The exploration service can communicate with the data plane 124.

The data plane 124 can include an execution service 118, a node history/result store 148, an orchestration service 120, an analytics knowledgebase 126, a sandbox service 122, and a multi-dimensional database 150. The execution service 118 can receive a new request. As the user explores via the graphical user interface the execution service 118 can store the history of the nodes in the exploration and any corresponding results sets in the node history/result store 148. The node history/result store 148 can be an in-memory database. In some embodiments, each thread in an exploration can correspond to or include a directed acyclic graph of nodes. Each node can be a step of exploration. The orchestration service 120 can receive the request(s) and use natural language model(s) to generate solution recipes. In some cases, the orchestration service 120 can use the pre-defined analytics knowledgebase 126 to help answer common questions, such as certain "why" and "what-if" type questions. The orchestration service 120 can facilitate dynamic code generation for code-generation type steps in the solution recipe and dynamic natural language text generation for natural-language-generation type steps. The dynamically generated code can include instructions specifically for graphical user interfaces and/or for creating visualizations with a GUI library.

As described herein, the sandbox service 122 can execute generated code in a sandbox. Executing dynamically generated code in a sandbox can have one or more advantages. First, executing dynamically generated code in a sandbox can be more secure than executing the code without sandbox protections. Next, the sandbox can be implemented within an isolated portion of a hosted computing environment and the sandbox can have the necessary libraries as defined by a container, virtual machine, or other isolated computing component in the hosted computing environment. The sandbox service 122 can self-debug the dynamically generated code until the output satisfies a threshold, such as not having errors or significant errors and/or the output sufficiently answers the prompt. During the solution recipe generation stages and the code/text generation stages, the orchestration service 120 and/or the sandbox service 122 can retrieve data from the node history/result store 148. The execution service 118 can cause data from the multi-dimensional database 150 to be loaded into the node history/result store 148. At each step during the data analytics process, such as creation of new nodes to the data analytics exploration tree, as new data sets are created or filtered, each set of data may be stored in the node history/result store 148 to maintain full provenance of the data sets and data set operations during a data analytics exploration session. The output from the orchestration service 120 and/or the sandbox service 122 can be propagated to the front end 106 and presented in a graphical user interface of the modular thread analytics exploration system 104.

In some embodiments, the node history/result store 148 can be omitted and the execution service 118, the orchestration service 120 and/or the sandbox service 122 can communicate directly with the multi-dimensional database 150.

As used herein, a "database" or "store" can refer to any data structure (and/or combinations of multiple data structures) for storing and/or organizing data, including, but not limited to, relational databases (e.g., Oracle databases, MySQL databases, etc.), non-relational databases (e.g., NoSQL databases, etc.), key-value databases, in-memory databases, tables in a database, and/or any other widely used or proprietary format for data storage. The multi-dimensional database 150 can be a relational database with multiple relational tables as data sets. The multi-dimensional database 150 can be included in BI platforms that help users analyze and visualize data for BI purposes. BI platforms can have data visualization; integrate data from multiple sources; provide reporting and visualizations, including charts, graphs, maps, and scatter plots; use AI to find insights in data sets; and/or offer tools for creating reports.

The components of the environment 100, such as the modular thread analytics exploration system 104 and/or the user computing device 102 can communicate over a network. The network may be any wired network, wireless network, or combination thereof. In addition, the network may be a personal area network, local area network, wide area network, cable network, satellite network, cellular telephone network, or combination thereof. In addition, the network may be an over-the-air broadcast network (e.g., for radio or television) or a publicly accessible network of linked networks, possibly operated by various distinct parties, such as the Internet. In some embodiments, the network may be a private or semi-private network, such as a corporate or university intranet. The network may include one or more wireless networks, such as a Global System for Mobile Communications ("GSM") network, a Code Division Multiple Access ("CDMA") network, a Long-Term Evolution ("LTE") network, or any other type of wireless network. The network can use protocols and components for communicating via the Internet or any of the other aforementioned types of networks, such as HTTP, TCP/IP, and/or UDP/IP.

The modular thread analytics exploration system 104 may be embodied in a plurality of devices. The modular thread analytics exploration system 104 may include a network interface, memory, hardware processor, and non-transitory computer-readable medium drive, all of which may communicate with each other by way of a communication bus. The network interface may provide connectivity over the network and/or other networks or computer systems. The hardware processor may communicate to and from memory containing program (a.k.a., computer-executable) instructions that the hardware processor executes in order to operate the modular thread analytics exploration system 104. Memory generally includes RAM, ROM, and/or other persistent and/or auxiliary non-transitory computer readable storage media.

Additionally, in some embodiments, the modular thread analytics exploration system 104 or components thereof are implemented by one or more virtual machines implemented in a hosted computing environment. The hosted computing environment may include one or more rapidly provisioned and/or released computing resources. The computing resources may include hardware computing, networking and/or storage devices configured with specifically config-
ured computer executable instructions. A hosted computing
environment may also be referred to as a "serverless,"
"cloud," or "distributed" computing environment.

Figure 2:
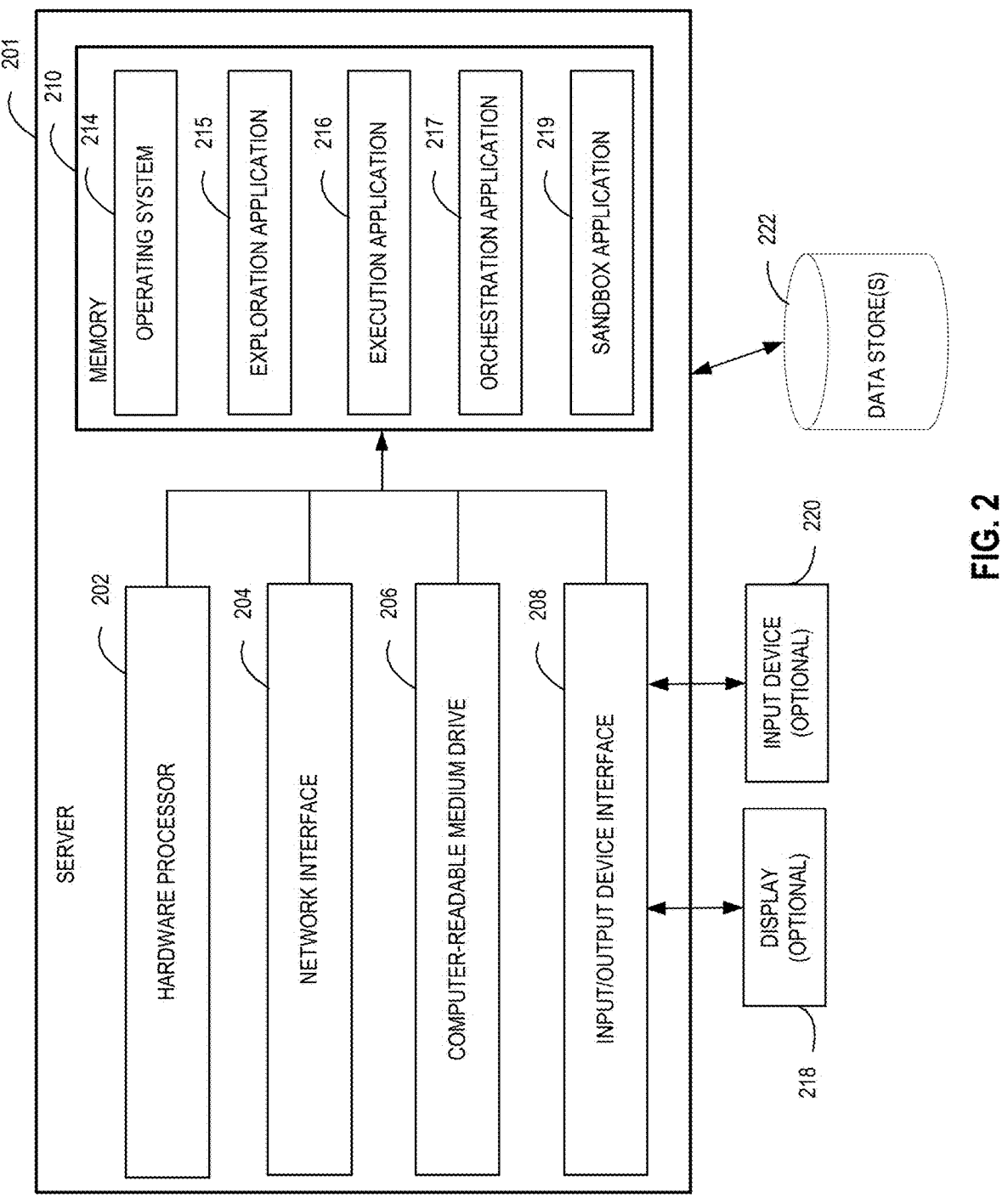
FIG. 2 is a schematic block diagram depicting can illustrative general architecture of a server for implementing aspects of the modular thread analytics exploration system referenced in the environment depicted in FIG. 1.

FIG. 2 is a schematic diagram of an illustrative general
architecture of a server 201 for implementing the modular
thread analytics exploration system 104 referenced in the
environment 100 in FIG. 2. In particular, a server 201 can be
used to implement a server in the control plane 110 and/or
the data plane 124. The server 201 includes an arrangement
of computer hardware and software components that may be
used to execute the exploration application 215, the execu-
tion application 216, the orchestration application 217, and
the sandbox application 219. The general architecture of
FIG. 2 can be used to implement other devices described
herein, such as the user computing device 102 referenced in
FIG. 1. The server 201 may include more (or fewer) com-
ponents than those shown in FIG. 3. Further, other comput-
ing systems described herein may include similar imple-
mentation arrangements of computer hardware and/or
software components.

The server 201 for implementing the modular thread
analytics exploration system 104 may include a hardware
processor 202, a network interface 204, a non-transitory
computer-readable medium drive 206, and an input/output
device interface 208, all of which may communicate with
one another by way of a communication bus. As illustrated,
the server 201 is associated with, or in communication with,
an optional display 218 and an optional input device 220.
The network interface 204 may provide the server 201 with
connectivity to one or more networks or computing systems.
The hardware processor 202 may thus receive information
and instructions from other computing systems or services
via a network. The hardware processor 202 may also com-
municate to and from memory 210 and further provide
output information for an optional display 218 via the
input/output device interface 208. The input/output device
interface 208 may accept input from the optional input
device 220, such as a keyboard, mouse, digital pen, and/or
touch screen.

The memory 210 may contain specifically configured
computer program instructions that the hardware processor
202 executes in order to implement one or more embodi-
ments of a device within the modular thread analytics
exploration system 104. The non-transitory computer-read-
able medium drive 206 can store the computer program
instructions. The memory 210 generally includes RAM,
ROM and/or other persistent or non-transitory computer-
readable storage media. The memory 210 may store an
operating system 214 that provides computer program
instructions for use by the hardware processor 202 in the
general administration and operation of the device within the
modular thread analytics exploration system 104.

The memory 210 may include the exploration application
215, the execution application 216, the orchestration appli-
cation 217, and the sandbox application 219 that may be
executed by the hardware processor 202. In some embodi-
ments, the exploration application 215, the execution appli-
cation 216, the orchestration application 217, and the sand-
box application 219 may implement various aspects of the
present disclosure. The exploration application 215 can
initiate or retrieve a workbook/threads for exploration pur-
poses. The execution application 216 can retrieve nodes/
results for a tree exploration. The execution application 216
can receive natural language input and provide the input to
the orchestration application 217. The orchestration appli-
cation 217 can invoke language model(s) to generate a solution recipe and then generate code or explanations for
steps in the solution recipe. The sandbox application 219 can
execute the generated code in a sandbox for safety and
testing purposes. Output can be passed from application to
application (such as the exploration application 215, the
execution application 216, the orchestration application 217,
and the sandbox application 219) until the output is pre-
sented in a graphical user interface.

The server 201 can communicate with the data store(s)
222. The data store(s) 222 can include the workbook/thread
state 138, the node history/result store 148, the analytics
knowledgebase 126, and/or the multi-dimensional database
150.

Figure 3:
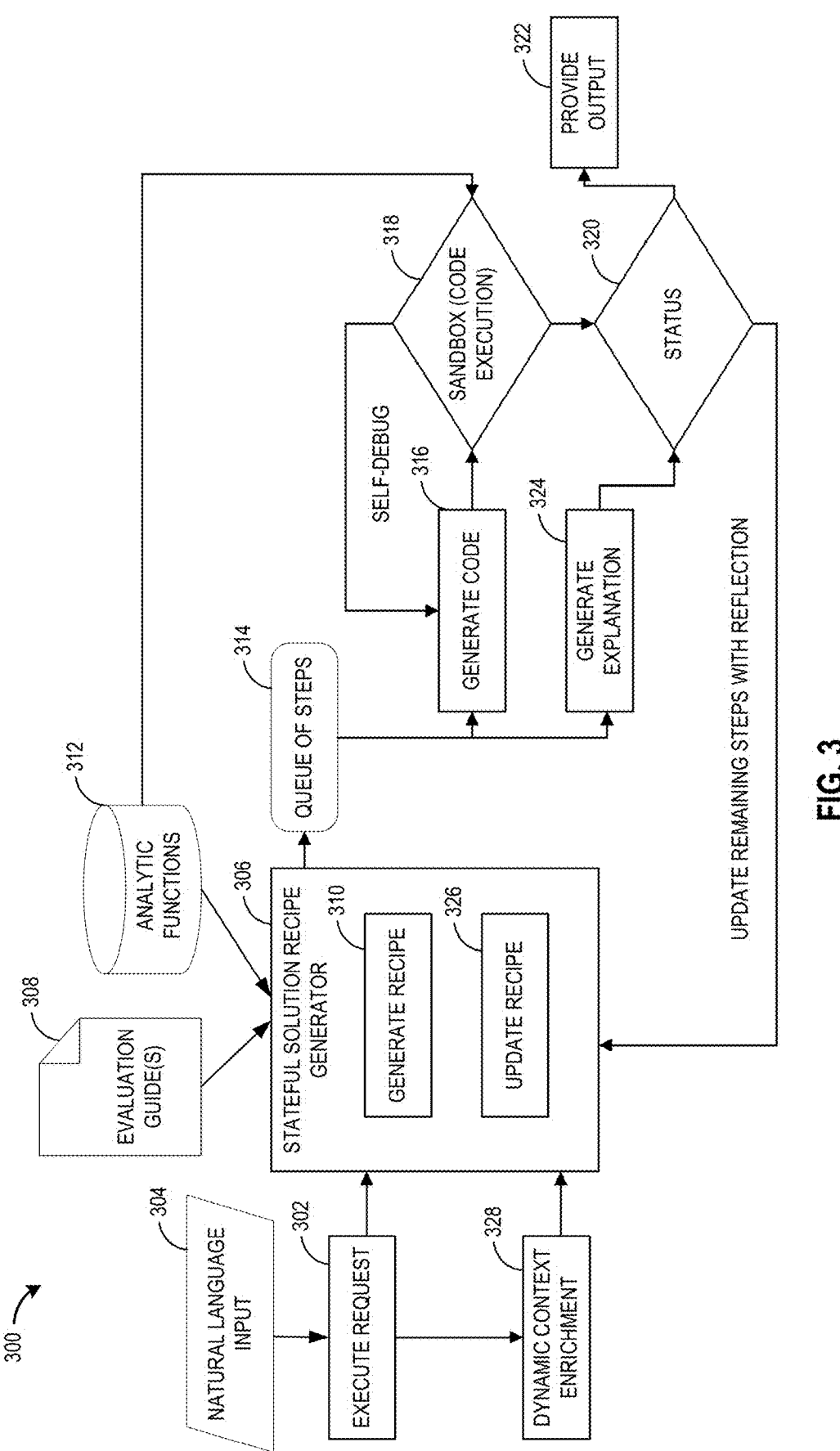
FIG. 3 is a schematic block diagram depicting an illustrative environment for solution recipe generation and information extrapolation from a multi-dimensional database.

FIG. 3 is a schematic block diagram depicting an illus-
trative environment 300 for generating/updating solution
recipes and reasoning extrapolation from a database query
platform. At block 302, a request can be executed. The
orchestration service 120 can execute a request. The request
can include an ambiguous natural language question from
natural language input 304. For example, the question may
be: "What drove the decrease in page views over the past 2
weeks?" In response, the orchestration service 120 can
invoke the stateful solution recipe generator 306 to execute
the request. The stateful solution recipe generator 306 can
use language models to generate/update solution recipes. At
block 310, a solution recipe can be generated.

The stateful solution recipe generator 306 processes natu-
ral language input into solution recipes. Solution recipes can
include one or more exploration steps. Each solution recipe
exploration step can involve text explanations, tool invoca-
tions, and/or code for execution. Depending on the estab-
lished relationships, the stateful solution recipe generator
306 can dynamically generate modified solution recipes
based on changes in an earlier-generated solution recipes or
new updates in the database query platform.

In some embodiments, the stateful solution recipe gen-
erator 306 utilizes the evaluation guides 308 to improve the
accuracy (or reduce unnecessary information) of the solution
recipe output. The stateful solution recipe generator 306 can
provide prompts in the form of questions to steer the
language model to generate solution recipes/exploration
steps that fit the input constraints. The stateful solution
recipe generator 306 can provide the prompt and the initial
input/context to the language model, such as, but not limited
to, the natural language input 304, one or more data sets,
and/or any other context. An example evaluation guide 308,
in the form of a series of questions, is provided below in
Table 1. In some embodiments, the evaluation guides 308
can be manually created and/or auto-generated by a lan-
guage model. As described herein, different evaluation
guides 308 can be used depending different factors. For
example, if this is a first exploration step one prompt can be
used, but if this is a later exploration step then a different
prompt can be used. In some exploration steps, no question
from an evaluation guide 308 is used.

---

1 ##Quiz Format
2 You need to first answer several quiz questions
to understand the problem and your previous steps
better. Then, you will provide a solution
recipe to solve the problem. Your
response should be structured as follows:
3 <quiz>
4 <question> Q1: (If this is not the first step)
Have you addressed the user's request in the
previous steps? Why? </question>
5 <answer> A1: (Your answer here) </answer>

-continued

```
6 <question> Q2: If the answer to the previous
question is no, what are some possible next
steps in high-level? Which one do you
think is the best next step? </question>
7 <answer> A2: (Your answer here) </answer>
8 <question> Q3: What statistical and realistic
assumptions have you made for this analysis?
Are there any simplifying assumptions needed?
Do you need to create any additional columns
for the analysis, and if so, why are they
necessary? </question>
9 <answer> Q3: (Your answer here) </answer>
10 <question> Q4: For the possible next steps
you mentioned in Q2, which one is the best
in terms of resolving the request in shortest
path? </question>
11 <answer> Q4: (Your answer here) </answer>
12 <question> Q5: If there are previous plan
steps, are the remaining steps still valid based
on the results so far? Are there any redundant
steps that can be removed or combined to make
the solution recipe more efficient? </question>
13 <answer> A5: (Your answer here) </answer>
14 <question> Q6: If this is not the first turn,
based on previous analysis results, is it necessary
to ask for more information from the user?
If yes, then only generate one solution
recipe step to ask for the information. </question>
15 <answer> A6: (Your answer here) </answer>
16 </quiz>
```

In embodiments where the stateful solution recipe generator 306 is to generate a recipe in response to the ambiguous question from natural language input 304, stateful solution recipe generator 306 may present the exploration steps in many different ways, some may be not useful. The question framework from the evaluation guide 308 provides a structure to guide stateful solution recipe generator 306 so that the outputting exploration steps can have low/no noise, no/less redundant steps, less/no unnecessary steps in the recipe, or reduction of other defects. This is one of the mechanisms that can be deployed to reduce/prevent hallucinations or errors from being introduced to the solution recipe. In some embodiments, the evaluation guide 308 can provide instructions and examples to stateful solution recipe generator 306. Table 2 shows example instructions that can be provided by the evaluation guide 308. Table 3 shows an example set of questions and answers that can be provided by the evaluation guide 308.

TABLE 2

```
1 ### Updating Plan Steps
2 You will be provided with the unexecuted plan
steps you previously generated. Based on
the executed plan steps, and also the unexecuted
steps, update the solution recipe to reflect
the current state of the task.
3 When updating the plan:
4-Review the previously executed steps and also
the unexecuted steps
5-Generate all remaining steps needed to complete
the task
6-Ensure that the new steps logically follow
from the executed steps
7-Adjust the step numbers to continue from the
last executed step
8-Provide a comprehensive plan that covers
all remaining work
9-Be prepared to modify or add steps if new
information or requirements arise
10 ## No More Steps Needed
11 Based on the previous results and quiz answers,
if no more step is needed, you should
```

TABLE 2-continued

```
immediately end the plan with: <current_plan_ended>
[fill in the reason . . . ]
</current_plan_ended> Note that for simple user
request, normally you need to end the plan
after just one step.
```

TABLE 3

```
1 ### Example 2: Updating plan after executing two steps
2 <quiz>
3 <question> Q1: (If this is not the first step) Have
you addressed the user's request in the
previous steps? Why? </question>
4 <answer> A1: We have partially addressed the
user's request in the previous steps. We
have filtered and cleaned the data, but we haven't
yet visualized or analyzed the results.
</answer>
5 <question> Q2: If the answer to the previous
question is no, what are some possible next
steps in high-level? Which one do you
think is the best next step? </question>
6 <answer> A2: Possible next steps include
creating visualizations, performing statistical
analysis, and summarizing findings. The best
next step is to create a bar chart to visualize
the mean values from the cleaned data. </answer>
7 <question> Q3: What statistical and realistic
assumptions have you made for this analysis?
Are there any simplifying assumptions needed?
Do you need to create any additional
columns for the analysis, and if so, why are they
necessary? </question>
8 <answer> A3: We're making the statistical
assumption that our cleaned data is
representative of the entire population
we're studying. We're also assuming that the
relationships between variables are linear,
which simplifies our analysis but may not capture
all nuance </answer>
9 <question> Q4: For the possible next steps you
mentioned in Q2, which one is the best in terms
of resolving the request in shortest path? </question>
10 <answer> A4: We have already filtered
and cleaned the data, and hence creating a bar
chart to visualize the mean values is the best
next step because it provides a clear visual
representation of the data. </answer>
11 <question> Q5: If there are previous plan
steps, are the remaining steps still valid based
on the results so far? Are there any redundant
steps that can be removed or combined to
make the plan more efficient? </question>
12 <answer> A5: The remaining steps are in
the correct direction. However, there are some
redundant steps in the current plan. Upon
checking the previous results, the table has been
sorted in the cleaning and filtering steps, so we
can remove the sorting step from the solution
recipe </answer>
13 <question> Q6: If this is not the first turn,
based on previous analysis results, is it
necessary to ask for more information from
the user' If yes, then only generate one plan step
to ask for the information. </question.>
14 <answer> A6: No, we have all the information
we need to proceed with the next steps of
creating visualizations and performing statistical
analysis. We can continue with the current
data and plan without requiring additional
information from the user. </answer>
15 </quiz>
```

The stateful solution recipe generator 306 can provide the natural language input 304 and any context to a language model. The language model can output a solution recipe. The language model can be a pre-trained model and a generative model, such as, but not limited to, a foundational LLM. The foundational LLM can come in different sizes. Each foundational LLM can be trained on billions or trillions of tokens and can have billions of parameters. The LLM can take a sequence of words as an input and predict a next word to recursively generate text. The LLM can be trained from text from languages with the most speakers (such as text from 10 or 20 languages with the most speakers) and can focus on languages with particular types of alphabets (such as Latin and Cyrillic alphabets). An example language model is Claude 3.5 Sonnet, which is a multifunctional language model. For example, Claude 3.5 Sonnet can generate code and perform knowledge-based question and answering; Claude 3.5 Sonnet has a large context window and low hallucination rates, which makes it capable of answering questions about large knowledge bases, documents, and codebases.

The stateful solution recipe generator 306 is "stateful" in that it includes contexts for analytical paths. As described herein, the data analytics exploration tree can be represented with a data structure stored in the workbook/thread state. As the stateful solution recipe generator 306 modified solution recipes, the modified solution recipes can take into account the state of previous user interactions, such as one or more natural language inputs provided to the modular thread analytics exploration system 104.

At block 328, dynamic context enrichment can be performed. The orchestration service 120 can perform dynamic context enrichment. Solution recipes can be stored, retrieved, filtered, and injected as extra context for the stateful solution recipe generator 306 when processing a natural language input. The predefined solution recipes can contain recipes for certain question types, execution code, tools, and/or keyword phrases used to index the solution recipes for retrieval. In some embodiments, the orchestration service 120 can maintain a pool of solution recipes. Each of the solution recipes can encode high-level strategies and/or best practices for solving tasks in a scenario. The orchestration service 120 can use embedding-based retrieval methods to select relevant recipes for a given query (e.g., based on the identified query intent to an area of relevant database) or context. The orchestration service 120 can use the selected recipe(s) to enrich the context provided to the stateful solution recipe generator 306. Using the customized, context-relevant, information from dynamic context enrichment 328, recipe generator 306 can change the prompt to the language model to steer it to output more effective strategies or reasoned exploration paths. As described herein, the orchestration service 120 can also determine context from the data analytics exploration tree and providing the context to language models. The orchestration service 120 can provide analytic functions 312 as part of the dynamic context enrichment process. In some embodiments, the analytic functions 312 can be selected using semantic search.

The stateful solution recipe generator 306 can select functions from the analytic functions 312 in some cases. The analytic functions 312 can introduce predefined skills into the AI-driven analytics workflow of the environment 300. The analytic functions 312 provide a library of specialized analytics functions that can be directly included by the stateful solution recipe generator 306, which can bridge the gap between high-level reasoning and specific data operations. The analytic functions 312 encapsulate complex analytics operations, such as contribution analysis, that would be challenging for language models to reliably generate from scratch. In some embodiments, the encapsulated analytics include a mix of AI-generated code with predefined expert-crafted analytics routines. The encapsulated analytics would act as a guiding framework that assist language model generation with vetted domain expertise. Such feature removes the need for a new language model to learn the whole enterprise repository because the analytic functions 312 will help recipe generator 306 focus on a relevant environment and therefore reduce time needed for expansive analysis.

Contribution analysis, also called key driver analysis, can be used to generate insights about changes to key metrics in multi-dimensional data. For example, contribution analysis can be used to determine the change in revenue numbers across two quarters or to compare two sets of training data to understand changes in an ML model's performance. Contribution analysis can be a form of augmented analytics based on deeper layer understanding of data. Contribution analysis can help users discover patterns in their data. A contribution analysis model can detect segments of the data that show statistically significant changes in a metric across time, by comparing a test set of data to a control set of data. This can enable insights into how the data changes across time, location, segment, or any other metric.

The analytic function 312, such as the contribution analysis function, can be designed to tackle "why" questions by identifying key factors driving changes in business key performance indicators. Some of the analytic functions 312 address "what-if" scenarios by enabling data modification and projection of metric changes, which allow users to explore hypothetical situations and their impacts. Other analytic functions 312 can be for generating visualizations.

At block 310, the stateful solution recipe generator 306 can generate a solution recipe. As described herein, a solution recipe can include a list of exploration steps in natural language. As described herein, the stateful solution recipe generator 306 can invoke the analytic functions 312 for some natural language input requests. The stateful solution recipe generator 306 can invoke the analytic functions 312 for "why" questions to identify, for example, key factors driving changes in key performance indicators. In some embodiments, each exploration step of the solution recipe can either be categorized as an explanation step or a code-generation step. The language model can output each exploration step of the solution recipe with a tag indicating the type of exploration step, such as, but not limited to, being an explanation step or a code-generation step. Non-limiting solution recipe examples are provided below in Tables 4 and 5.

TABLE 4

| |
| --- |
| 1 <user> What's driving sales ?</user> |
| 2 <solution-recipe> |
| 3 Step 1: Organize sales data by Product, Region, Industry, and Segment, calculating total sales for each. |
| 4 Step 2: Identify top performers in each category (Product, Region, Industry, Segment). |
| 5 Step 3: Create bar charts to visually represent the top 5 contributors in each category. |
| 6 Step 4: Analyze sales trends over time by creating a line graph showing total sales for each date. |
| 7 Step 5: Examine relationships between Quantity, Discount, and Sales using scatter plots. |
| 8 Step 6: Summarize findings, highlighting the main factors driving sales based on the analysis. |
| 9 </solution-recipe> |

TABLE 5

```
1 <user>How can we increase sales ?</user>
2 <solution-recipe> Step 1: Examine product performance
in terms of sales, profit margins, and growth over time.
3 Step 2: Analyze sales variations across different regions
to identify areas for improvement or expansion.
4 Step 3: Evaluate customer segments and industries to
find groups with the best growth opportunities.
5 Step 4: Assess the impact of current discount strategies
on sales and profits.
6 Step 5: Review sales trends over time to identify patterns
or growth opportunities.
7 Step 6: Summarize findings and propose strategies
to increase sales based on the analysis.
8 </solution-recipe>
```

The stateful solution recipe generator 306 can add the exploration steps of the generated solution recipe to the queue of steps 314. The orchestration service 120 can remove a exploration step from the queue of steps 314 and process the step at the generate-code block 316 or the generate-explanation block 324, depending on the type of step. At block 324, a natural language explanation can be generated. For example, a language model can receive a step from the solution recipe and generate a natural language explanation based on the input step. For example, based on the results of data analytics, the orchestration service 120 can generate output text, such as "In the last two weeks, referral traffic decline by 89.0%".

At block 316, code can be generated. The orchestration service 120 can generate code for the exploration step with a language model. Based on the input exploration step and a prompt to generate code, the language model can output code to accomplish goals of the exploration step. In some examples, the generated code can include visualization code. In some embodiments, the generated code can be in Python. The generated code can reference functions from a code library and use the code library, such as, but not limited to, code libraries for data science and data analysis (such as NumPy and Pandas). In some embodiments, the orchestration service 120 can invoke the analytic functions 312 that include customized functions for generating code for visualizations.

At block 318, the generated code can be executed in a sandbox. If there are any errors, the sandbox service 122 can self-debug the generated source code by passing the error to the orchestration service 120. At block 316, the orchestration service 120 can generate new code with the previous input data and with the recent error. The newly generated code can be processed again in a sandbox at block 318 in a loop.

At block 320, the status of the output can be checked. For example, the orchestration service 120 can check the output of the generated source code to determine whether the output satisfies the corresponding input exploration step. If it does, at block 322, the orchestration service 120 can provide the output from the generated code to the front end 106. Similarly, if the generated explanation sufficiently explains the corresponding input exploration step, then, at block 322, the orchestration service 120 can provide the output from the generated explanation to the front end 106.

As shown, any remaining exploration steps from the solution recipe can be updated at block 326. In some embodiments, the stateful solution recipe generator 306 can receive updated context, which can include the context from the dynamic context enrichment performed at block 328. The context can include the output from any exploration steps that have been executed. In some embodiments, regardless of whether there have been any errors, the stateful solution recipe generator 306 can update any remaining unexecuted exploration steps from the solution recipe. Before the stateful solution recipe generator 306 generates a modified solution recipe, the stateful solution recipe generator 306 can provide questions from evaluation guide(s) 308 to the natural language model to steer the model's output. The orchestration service 120 can provide the exploration steps from the modified solution recipe to the queue of steps 314 and the orchestration service can cause the remaining exploration steps of the solution recipe to be processed in a loop.

Figure 4:
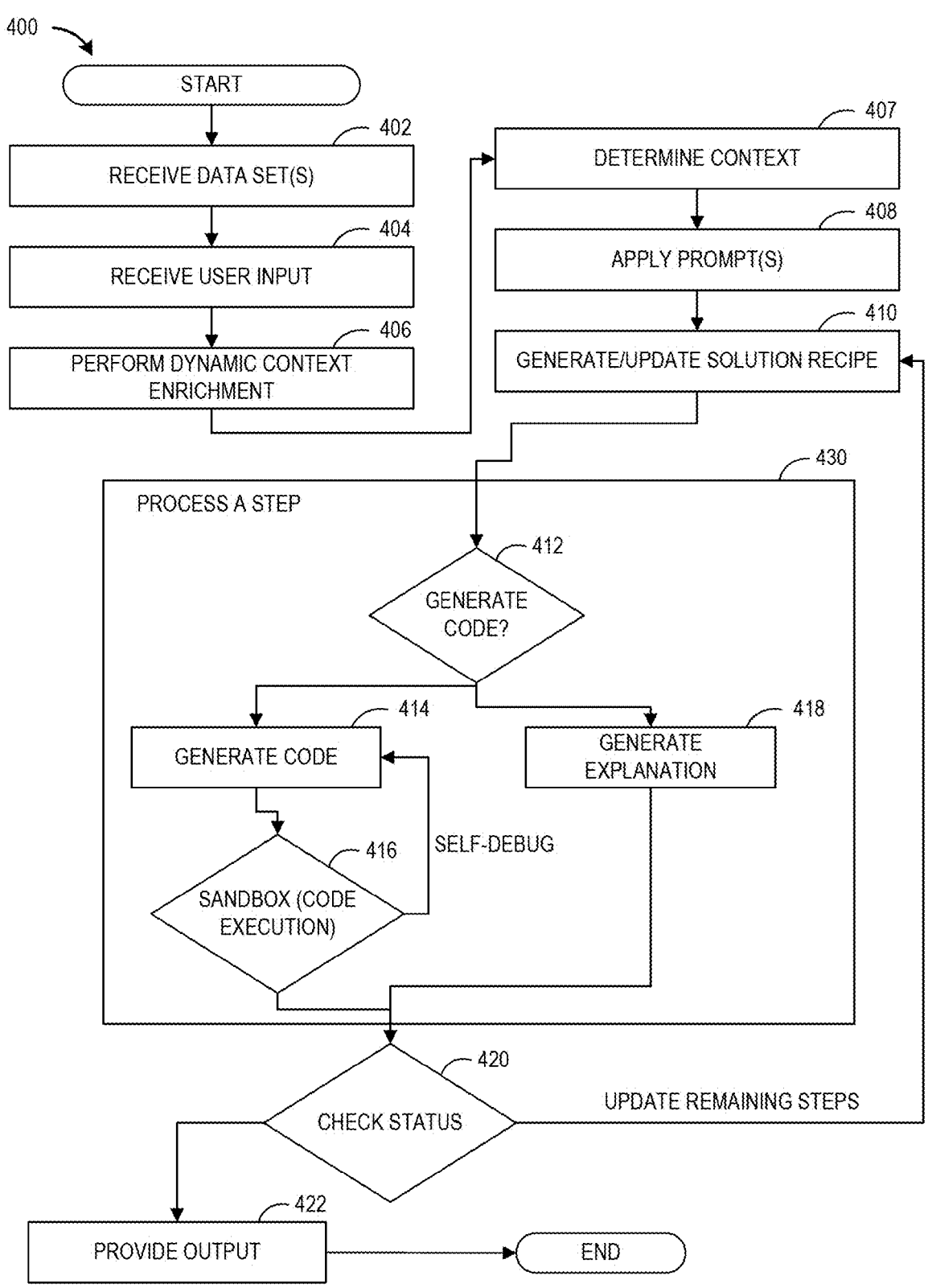
FIG. 4 is a flow chart depicting a method implemented by the modular thread analytics exploration system for solution recipe generation and information extrapolation from a multi-dimensional database.
Figure 5A:
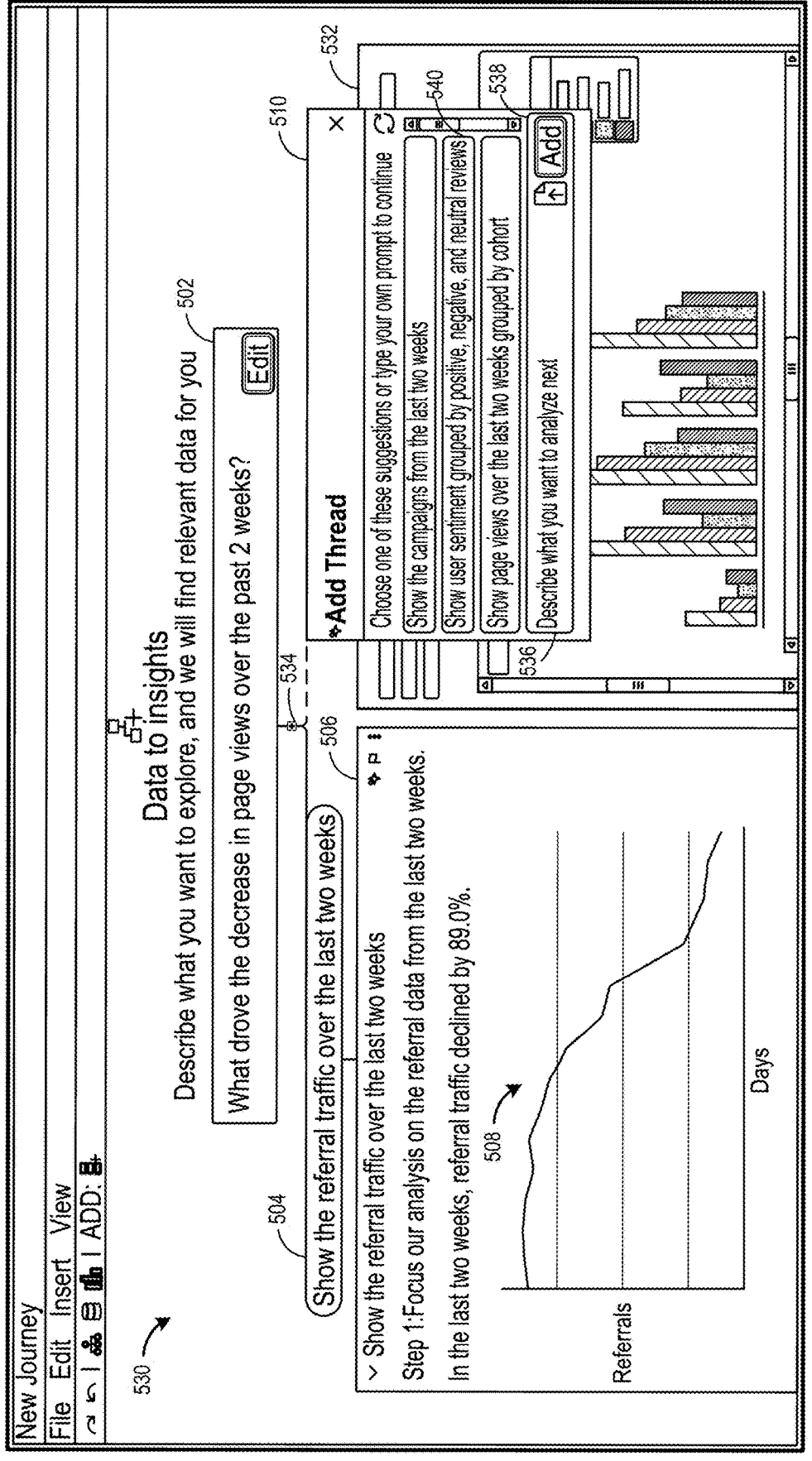
FIGS. 5A, 5B, and 5C depict example graphical user interfaces of a modular thread analytics exploration system presented on a user computing device.
Figure 5B:
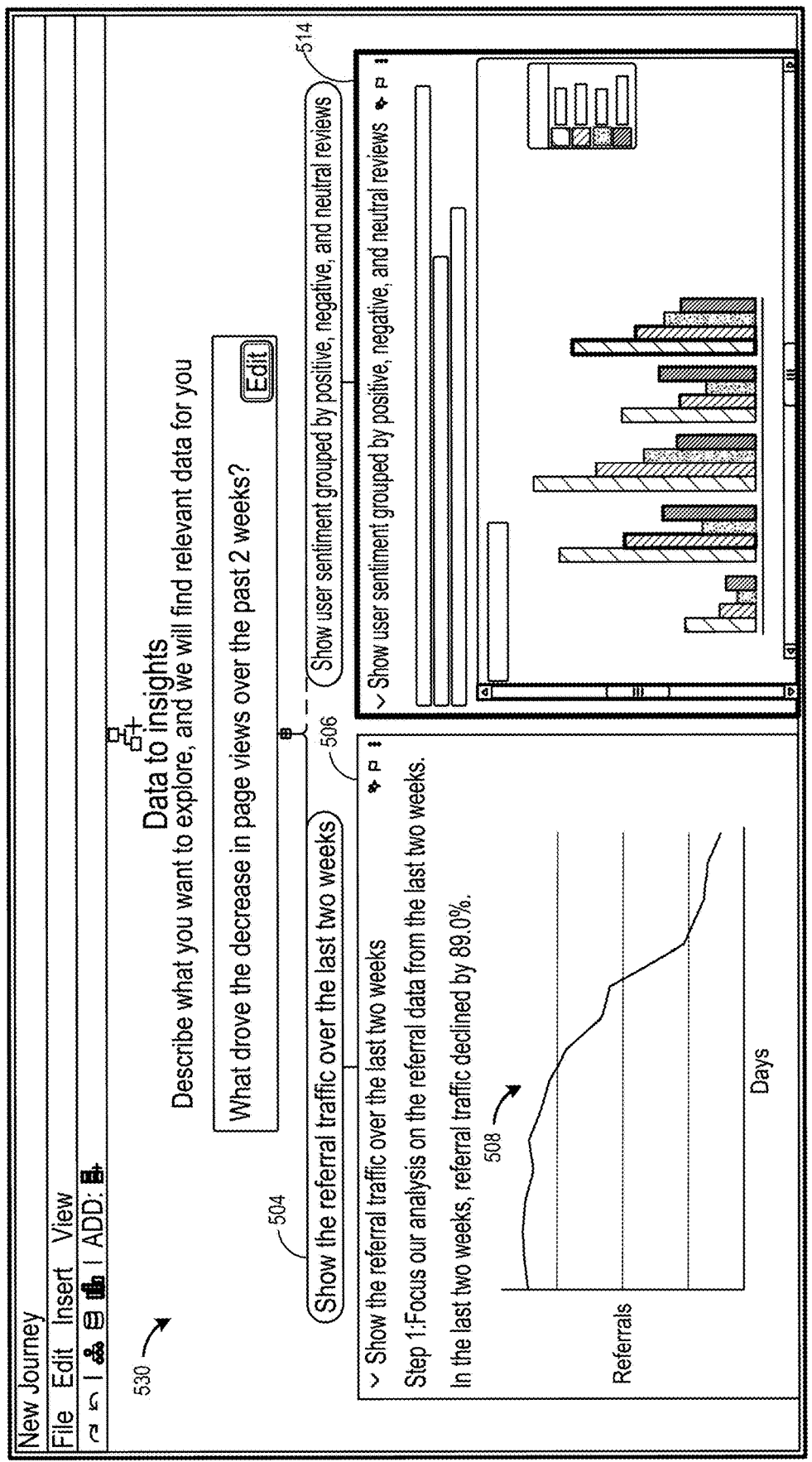
Figure 5C:
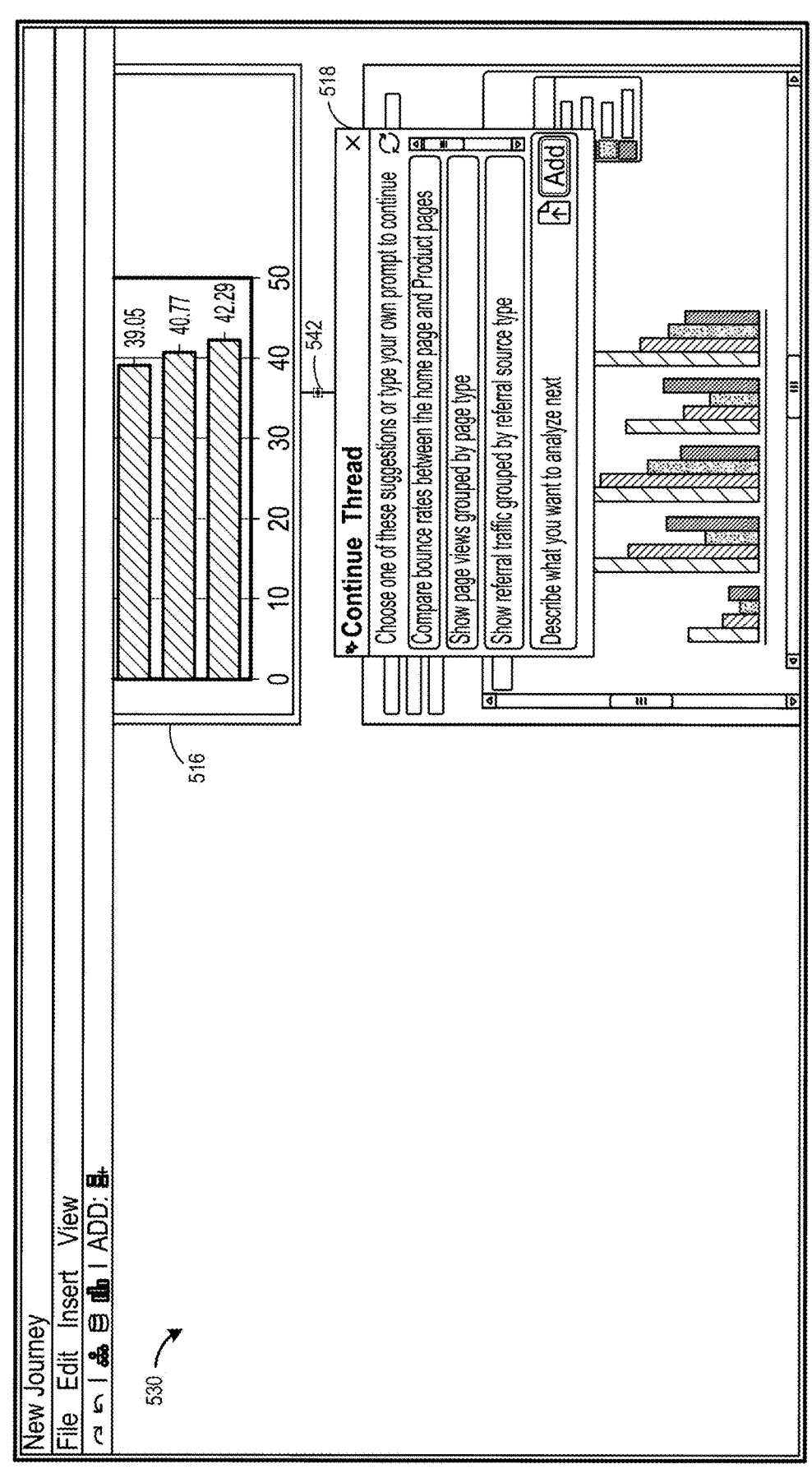

FIG. 4 includes a flow chart depicting a computer-implemented method 400 for solution recipe generation and reasoning extrapolation from a multi-dimensional database. The method 400 can enable enterprise database query platform to answer ambiguous questions such as, but not limited to: "What drove the decrease in page views over the past 2 weeks?" "How did tech stocks change prices in 2014?" "How can we get the Chicago branch to perform as well as New York?" The method 400 can cause presentation, via the graphical user interface, of one or more nodes in a data analytics exploration tree, which is described in further detail herein, such as illustrated in FIGS. 5A-5C. As described herein, aspects of the modular thread analytics exploration system 104 may be implemented with the server 201 of FIG. 2. Also, as described herein, the modular thread analytics exploration system 104 can include a control plane 110 and a data plane 124. In some embodiments, the control plane 110 includes an exploration service 116 and the data plane 124 includes an execution service 118, an orchestration service 120, and a sandbox service 122, which may implement aspects of the method 400. As described herein, the server 201 can implement aspects of the method 400. Additional details regarding the method 400 are provided herein, such as with respect to FIGS. 2 and 3.

Beginning at block 402, a data set is received. In some embodiments, the front end 106 receives a data set from the user computing device 102. A user can upload a data set (such as a comma-separated values file) via a graphical user interface of the modular thread analytics exploration system 104. For example, a user can, via a graphical user interface, upload stock data for a particular year. The modular thread analytics exploration system 104 adds the data set to the node history/result store 148. Additionally or alternatively, a data set is added to the multi-dimensional database 150 before a user begins a data analytics exploration tree in the graphical user interface, which can be propagated to the node history/result store 148.

At block 404, user input is received. The front end 106 receives user input, such as, but not limited to natural language input from a user computing device. Example natural language input can include the following text. "What drove the decrease in page views over the past 2 weeks?" "How did tech stocks change prices in 2014?" "How can we get the Chicago branch to perform as well as New York?" In some cases, the natural language input is not a direct query of the multi-dimensional database (such as "How many users visited this month?") but instead is a request for an analytical explanation based on data associations from the multi-dimensional database. The exploration service 116 processes the input (such as natural language input) received from front end 106 and the user computing device 102. For example, the exploration service 116 provides the natural language input to the execution service 118 for further processing. In some cases, the natural language input indicates a request to generate a solution recipe that includes exploration steps. Additional user input can include user interactions with a graphical user interface. For example, a user can branch threads from nodes in a data analytics exploration tree and/or create new nodes on existing threads. As another example, a user can select a suggested new thread or suggested actions to continue data analysis on a particular thread. The front end 106 also receives, via a graphical user interface, a user interaction associated with the data analytics exploration tree. Additional details regarding graphical user interfaces that can receive user input are described herein, such as with respect to FIGS. 5A-5C.

At block 406, dynamic context enrichment is performed. The orchestration service 120 performs dynamic context enrichment. The dynamic context enrichment is configured to determine a predefined solution recipe based at least in part on the natural language input. In some embodiments, the orchestration service 120 determines the predefined solution recipe with a semantic search. In some embodiments, the orchestration service 120 converts the natural language input to a first embedding; determines a second vector embedding associated with the predefined solution recipe; and selects the predefined solution recipe based at least in part on a similarity between the first vector embedding and the second vector embedding. The embedding represents the natural language text. Example embeddings include, but are not limited to, vector embeddings or sparse embeddings. The orchestration service 120 determines input to the language model from (i) the predefined solution recipe as a prompt and (ii) the natural language input. In some embodiments, the orchestration service 120 prepends the predefined solution recipe as a prompt to the natural language input.

Dynamic context enrichment enhances the stateful solution recipe generator 306 performance by enriching the context with high-quality, predefined solution recipes. There can be different types of predefined solution recipes. The first type consists of high-level solution recipes, which include, but are not limited to, sets of instructions, rubrics, guidelines, and/or exemplars for the stateful solution recipe generator 306 to improve solution recipe generation. The second type includes low-level solution recipes, which include, but are not limited to, instructions and exemplars for code generation, such as providing common practices and rubrics for generating correct code. The predefined solution recipe pool originates from different sources. A first source can be from a trusted source that provide examples for answering advanced analytics questions, such as why, what-if, and forecast questions. The second source can be from another source that created human-annotated solution recipes. Additional sources for predefined solution recipes are possible.

To process the recipes, a service, such as the orchestration service 120, uses a language model to rewrite solution recipes into multi-turn dialogue formats. The predefined solution recipes are then embedded to fixed-length vectors using an encoder model. A language embedding model is used by the orchestration service 120 to generate embeddings for both natural language input and predefined solution recipes. The solution recipe embeddings are then indexed for efficient retrieval. In some embodiments, the orchestration service 120 generates a similarity score between the embedding for the natural language input and the predefined solution recipe.

At inference time, the orchestration service 120 determines a vector embedding of the new natural language input. The orchestration service 120 retrieves the top-k related, predefined solution recipes as enriched context. As described herein, these retrieved predefined solution recipes are pre-appended to the user query/natural language input. The enriched query is passed to the stateful solution recipe generator 306 for solution recipe generation. This approach allows the modular thread analytics exploration system 104 to steer the structure, tone, and content of generated solution recipes (which is especially true for complex use cases).

As part of the dynamic context enrichment process, the orchestration service 120 selects the analytic functions 312. As described herein, the analytic functions 312 include code instructions configured to be provided to a language model. Similar to a semantic search for predefined solution recipes (such as by using embeddings-retrieval methods), the orchestration service 120 can use semantic search to identify relevant functions from the analytic functions 312 for context. Instead of having a code generator write analytic functions from scratch, the orchestration service 120 provides relevant functions from the analytic functions 312 to the language model to improve model accuracy. Additionally or alternatively, some predefined solution recipes can be associated with one or more functions from the analytic functions 312 and the associations can be stored in a data store. Accordingly, if the orchestration service 120 selects a predefined solution recipe, then the orchestration service 120 automatically selects one or more functions from the analytic functions 312 based on the associations, which can be provided to a language model.

Selective determination of predefined solution recipes and analytic functions 312 can advantageously improve language model performance. Language models, if provided too many input tokens, can experience latency in generating output. Accordingly, dynamic selection of specific predefined solution recipes and/or functions from the analytic functions 312 can advantageously improve language model performance by limiting the input tokens to a language model. Accordingly, dynamic limitation of input to a language model can improve the functioning of a large database query platform and also improve the user experience since output can be provided to a user faster.

At block 407, context is determined. Context includes output from previous exploration steps and/or user interactions with the user interface. In the context of user interactions, the stateful solution recipe generator 306 determines interaction data associated with the user interaction and provides the interaction data to a language model. For example, if a data set is filtered in a node in a current thread, then the stateful solution recipe generator 306 adds the filtered data set to the context. Similarly, if a user provides natural language query text at a particular node, then the stateful solution recipe generator 306 adds the natural language query text to the context.

At block 408, a prompt is applied to a language model. The stateful solution recipe generator 306 uses evaluation guides (such as a series of questions) to improve the accuracy of the solution recipe output. The stateful solution recipe generator 306 is configured to generate a prompt to the language model. In some embodiments, additional prompts are provided to the language model before or with the natural language input. As described herein, dynamic context enrichment 328 can output a predefined solution recipe and/or an analytic function. For example, the orchestration service 120 provides the predefined solution recipe/ an analytic function to the language model as a prompt. The stateful solution recipe generator 306 generates prompts by adding a predefined solution recipe to a template prompt from the dynamic context enrichment 328 that results in the prompt. The stateful solution recipe generator 306 generates prompts by adding an analytic function to a template prompt from the dynamic context enrichment 328 that results in the prompt. Additionally or alternatively, the orchestration service 120 uses evaluation guides (such as a series of questions) as a prompt. The orchestration service 120 determines a evaluation guides configured to improve language model problem solving. The orchestration service 120 provide the evaluation guides to the language model as a prompt. The orchestration service 120 determines input to the language model from (i) the evaluation guides and (ii) the natural language input. In some embodiments, the orchestration service 120 prepends the evaluation guides as a prompt to the natural language input. Determining the evaluation guides can include selecting which set of questions to use based on the particular exploration step in the solution process. For example, if a first exploration step/first solution recipe is to be generated, then a first evaluation guides are used by the orchestration service 120. On the other hand, if a second or other subsequent exploration step is to be processed, then a second evaluation guides are used by the orchestration service 120. Additional details regarding evaluation guides are provided herein, such as with respect to Tables 1-3.

At block 410, a solution recipe is generated or updated. The orchestration service 120 generates or updates a solution recipe. In particular, the stateful solution recipe generator 306, based on natural language input, provides input to a language model. As described herein, such as with respect to the previous blocks 406, 407, 408 for determining context and prompts, the stateful solution recipe generator 306 combines the natural language input with context and/or prompts (such as the determined evaluation guides) as input to a language model. The language model generates a solution recipe that includes multiple ordered exploration steps in natural language. In some cases, the multiple ordered exploration steps correspond to a possible reason exploration path to the user query. As described herein, some solution recipes include code-generation steps and explanation steps, which can be tagged as such by the language model in the solution recipe. Additional details regarding solution recipes are provided herein, such as with respect to Tables 4 and 5.

At block 430, a exploration step from the solution recipe is processed. The orchestration service 120 processes the exploration steps from the solution recipe in order. Processing the exploration step at block 430 includes block 412 for determining whether code should be generated, block 414 for generating code, block 418 for generating explanations, and block 416 for executing code in a sandbox.

At block 412, it can be determined whether code should be generated for a exploration step. The orchestration service 120 can process the exploration step as tagged. The orchestration service 120 can generate code for exploration steps tagged for code generation and generate explanations for exploration steps tagged for explanation. If the exploration step is a code generation step, then the method 400 proceeds to block 414 to generate code. Otherwise the method 400 proceeds to block 418 to generate an explanation.

At block 414, code is generated. The orchestration service 120 provides the exploration step to a language model. The language model generates executable code instructions. For example, the orchestration service 120 provides an exploration step to the language model such as, "show the price change for top 5 tech stocks in 2014," and the language model can generate code instructions based on the input to the language model. In some embodiments, the code instructions are in Python. The generated code reference functions from a code library and invokes the code library, such as, but not limited to, code libraries for data science and data analysis (such as NumPy and Pandas). The prompts to the language model for code generation are configured to improve the accuracy of the generated code. For example, for data analysis code, such as code that uses the Pandas library, it is common for sample data analytics code to reference data frame variables as "df," "df1," or "df2." The language model can be trained on many code samples that follow this variable convention. However, with complex data analytics, multiple sets of data are used and following that convention for variable identification often causes the language model to output code that does not work or have errors since that common variable convention is used for multiple distinct data sets. Accordingly, the prompt to the language model for code generation instructs the language model to use more descriptive variable names such as "df_page_views" or "df_acquisitions_data" that results in more accurate generated data analytics code. In some embodiments, the language model that generates solution recipes at the previous block 410 is the same language model that generates code instructions.

At block 416, the generated code is executed in a sandbox. The sandbox service 122 executes the executable code instructions in a sandbox. The executable code instructions are able to perform data analytics. For example, in some embodiments, execution of the executable code instructions queries a data set, from the node history/result store 148, that returns a subset of data and determines analytic output from the subset of data. For example, the code instructions queries stock price data for technology stocks, calculates the change in price of those technology stocks, and sorts the change in price to identify a threshold number of stocks with the greatest change in price. The execution service 118 stores the subset of data in the node history/result store 148. As described herein, subsequent iterations of the method 400 can result in multiple executions of code, queries of data sets, and analytic outputs, which can be chained together such that the output of one execution can be queried in a subsequent execution of code.

The orchestration service 120 also generates front end code. The orchestration service 120 determines visualization code configured to cause presentation of a visualization with the analytic output. The visualization code can generate charts, graphs, or other visualizations. In some embodiments, the orchestration service 120 invokes predefined functions to generate the visualization code, which can be proprietary visualization code in some implementations. Additionally or alternatively, the orchestration service 120 provides the analytic output to a language model and the language model generates the visualization code. In some embodiments, a node in the data analytics exploration tree is associated with the visualization.

The sandbox service 122 executing the executable code instructions in the sandbox can result in error output. As shown, the method 400 can return to block 414 to generate updated code and self-debug. At block 414, the sandbox service 122 can provide the exploration step and the error output to the language model. The language model generates updated executable code instructions, which is executed again in the sandbox. The sandbox service 122 can attempt a threshold number of times (such as three) to self-debug. If debugging fails, the exploration step is marked as failed, and the stateful solution recipe generator 306 can be prompted to generate a modified solution recipe.

At block 418, an explanation is generated. The orchestration service 120 provides the explanation step to the language model. The orchestration service 120 also provides context to the language model, such as output from previous exploration steps, user interaction data, and/or output from dynamic context enrichment. The language model generates explanatory text. For example, if the exploration step is "Focus analysis on the stock data from the year 2014," the language model generates explanatory text such as "Among the analyzed tech stocks in 2014, FB showed the highest price increase at 42.3%, followed by NTC at 40.8% and AAPL at 39.0%." In some embodiments, the language model is the same as the model that generates solution recipes and/or code. In other embodiments, a different language model is used that is different from the model generates solution recipes and/or code.

At block 420, the status of the exploration step processing is checked. The orchestration service 120 determines whether the output satisfies a threshold. For example, if the output from code generation or text explanation generation is without errors, then the method proceeds to block 422 to provide output. The orchestration service 120 causes the stateful solution recipe generator 306 to cause the language model to output the initial solution recipe and update the initial solution recipe to a modified solution recipe. In some embodiments, a language model is used to check the status of the output from code generation or text explanation generation. For example, if the output does not have errors then the output can pass the status check. As another example, a language model is asked whether the output answers the question associated with the particular exploration step being processed. If yes, then the output is provided. Otherwise, the exploration step is reprocessed after being marked as failed.

At block 422, output is provided. The exploration service 116 provides output to the front end 106. The exploration service 116 causes the front end 106 cause a display of the initial solution recipe and/or the modified solution recipe. In some cases, the front end 106 causes presentation of the output, which includes executing visualization code to cause presentation of visualizations. The front end 106 executes the visualization code that causes presentation of the visualization on the user computing device 102. The front end 106 also causes presentation of explanatory text on the user computing device 102. The front end 106 causes presentation of the output (such as text and/or visualizations) in response to receipt of user interactions.

At block 420, it is determined if there are remaining exploration steps. The orchestration service 120 determines remaining exploration steps by excluding the processed exploration step from the exploration steps of the solution recipe. If there are remaining exploration steps, then the method 400 returns to block 410 to update the solution recipe and process the remaining exploration steps. At block 410, a modified solution recipe is generated.

The orchestration service 120 updates the solution recipe. In particular, the stateful solution recipe generator 306 provides (i) the remaining exploration steps, (ii) the natural language input, and (iii) output from the executable code instructions to the language model. The language model generates a modified solution recipe that includes updated exploration steps. As described herein, updating the remaining exploration steps with reflection improves accuracy. The updating of the remaining exploration steps occurs whether or not there are errors in processing the solution recipe. The stateful solution recipe generator 306 receives updated context, which includes any subsequent user input, such as, user interactions with the graphical user interface and additional natural language input. The orchestration service 120 is able to determine context text data associated with a node in the data analytics exploration tree preceding the updated exploration step. In the case of dynamic context enrichment, the modified solution recipe can be based at least in part on the predefined solution recipe and/or the analytic function. At block 430, an updated exploration step from the modified solution recipe is processed in a loop. In the context of subsequent user interactions, to process an updated exploration step, the stateful solution recipe generator 306 determines interaction data associated with the user interaction and provides the updated exploration step and the interaction data to a language model. Example user interactions include adding a new node to an existing thread in the data analytics exploration tree, adding a new thread to the data analytics exploration tree, or in-place modifying of a node in the data analytics exploration tree. Thus, any additional natural language input provided or selected during a user interaction is added to the context. The stateful solution recipe generator 306 also provides the updated exploration step and context data to the language model. As described herein, in some cases, the language model generates the text.

As described herein, re-predicting remaining exploration steps after each exploration step is processed results in more accurate solution recipes. This approach is approach is more resource intensive and trades off long-term accuracy for speed. By re-predicting remaining exploration steps after each exploration step is processed, a solution recipe is able to continuously adapt via execution. The reflection of processing remaining steps allows the stateful solution recipe generator 306 to assess the observation of the action and modify solution recipes accordingly. For example, without continuous processing of exploration steps, it is possible that an initial solution recipe encounters errors in a beginning or middle step and is unable to complete the structured reasonings/projections from complex data task. Accordingly, the improved techniques described herein for re-predicting remaining exploration steps results in more accurate predictions at the expense of using more resources as opposed to using less resources that results in less accurate/incomplete/broken solutions.

At block 404, additional user input is received. For example, the front end 106 receives, from the user computing device 102, a request for a new thread suggestion. In response to receiving the request for a new thread suggestion, the orchestration service 120 provides the natural language input to the first language model a second time with a new or modified prompt. For a new thread suggestion, the orchestration service 120 can provide a prompt to the language model the constrains the question types to be suggested. For example, the prompt provided to the model indicates that the type of output for the suggestion should be limited to data analytics suggestions or predictive what-if types of suggestions. A modified prompt to the language model can include the previous solution recipe and a new instruction to the language model to generate a new solution recipe constrained to a particular question type, such as a what-if type question. The language model generates a second solution recipe different from the first solution recipe. In some embodiments, the orchestration service 120 includes a prompt that instructs the language model to generate a solution recipe different from the originally generated solution recipe (e.g., a different reasoning path and exploration steps). The orchestration service 120 selects a suggested exploration step from the second solution recipe, which can be the first exploration step from the second solution recipe. The front end 106 causes presentation of the suggested exploration step in a graphical user interface on the user computing device 102. Additional details regarding suggested new threads are described herein, such as with respect to FIG. 5A.

As another example, the front end 106 receives, from the user computing device 102, a request for a continue thread suggestion. In response to receiving the request for a continue thread suggestion, the orchestration service 120 selects a suggested next exploration step from the updated exploration steps of a modified solution recipe. The front end 106 causes presentation of the suggested next exploration step in the graphical user interface on the user computing device 102. Additional details regarding continuing threads are described herein, such as with respect to FIG. 5C.

In some embodiments, the front end 106 receives a request to replay at least a portion of the data analytics exploration tree. The orchestration service 120 is able to cause re-execution of code associated with a node in the portion of the data analytics exploration tree. For example, a thread in a data analytics exploration tree presents data analytics with respect to one or more data sets. If the thread in the data analytics exploration tree is replayed and the underly data set has been updated, then execution service 118 reruns the code in the thread and accesses the updated data set to present updated data analytics. Th execution service 118 retrieves state from the workbook/thread state 138, which can represent an analytical path, and can execute each node in the path in order. Each node in the path can be associated with executable code that operates on data from the node/history result store 148 and stores data sets output from those nodes back into the node history/result store 148. Each version of the data sets can be versioned such that the modular thread analytics exploration system 104 stores the provenance of data analytics exploration trees. If there is an error with the updated data set during a replay, then the orchestration service 120 causes presentation of the error.

In some embodiments, the solutions for modular thread analytics exploration and/or extrapolation of information from a multi-dimensional database includes improved graphical user interfaces. As described herein, the graphical user interface is configured to allow a user, starting from a root, to explore different data analytics threads with natural language input and branch off new threads of from common nodes in a data analytics exploration tree, which can be visualized in the same graphical user interface. The modular thread analytics exploration system can maintain the state of data analytics exploration trees. In some embodiments, the data analytics exploration tree can be persisted and a thread in the data analytics exploration tree or the entire tree can be "replayed" with updated data. Accordingly, the modular thread analytics exploration system can enable information extrapolation from multi-dimensional databases with improved graphical user interfaces that allow non-technical users to analyze data in a manner that is impossible with existing systems.

FIGS. 5A, 5B, and 5C depict graphical user interfaces 500 of a modular thread analytics exploration system 104, which can be presented on a user computing device. The modular thread analytics exploration system 104 allows users to analyze their data sets with AI driven analysis with a user in the loop at each step of the way. The modular thread analytics exploration system 104 can take ambiguous instructions (e.g., "why" or "what-ifs") in natural language from the user and turns them into feasible plans that can be executed interactively. In some embodiments, while not shown, a user can select a data set to explore and/or upload a data set to explore.

In FIG. 5A, the graphical user interface 500 includes an exploration area 530. When a user is presented the graphical user interface 500 for a first time and without opening an existing data analytics exploration tree, the exploration area 530 may be clear in that user interface elements 504, 506, 510, 532 are not initially presented. Instead, the graphical user interface 500 can initially include the input element 502, and, as shown, the user can provide the natural language input: "What drove the decrease in page views over the past 2 weeks?" In response to receiving the natural language input, the modular thread analytics exploration system can dynamically update the graphical user interface 500. For example, in response to receiving the natural language input, the graphical user interface 500 can present a user interface element (similar to the user interface element 510) listing different options (such as "Show the referral traffic over the last two weeks") and/or providing an input element for a user-provided option. In the example of FIG. 5A, the user can provide or select the natural language input (here "Show the referral traffic over the last two weeks"). In response to receiving the natural language input, the graphical user interface 500 can dynamically generate and present the first user interface element 506 (which can correspond to a panel widget user interface element as shown). The modular thread analytics exploration system 104 can thus process natural language prompts that would otherwise be ambiguous to older LLM systems.

The first user interface element 506 can include a visualization 508 (here a graph). The first user interface element 506 can also include explanatory text, here "Step 1: Focus our analysis on the referral data from the last two weeks" and "In the last two weeks, referral traffic declined by 89.0%." The first user interface element 506, which can be referred to as a node, can include multiple visualizations and/or sets of text that are generated by the modular thread analytics exploration system. As shown, a user can select an add-new-thread user interface element 534, which can cause the graphical user interface 500 to present the add-thread user interface area 510. The add-new-thread user interface element 534 can be a request for a new thread suggestion. As shown, the add-thread user interface area 510 includes suggested exploration steps that are selectable by the user. In the graphical user interface 500, new threads can be added at any node. In FIG. 5A, a user has added a new thread from the root node, which was the initial natural language input prompt, here "What drove the decrease in page views over the past 2 weeks?" The modular thread analytics exploration system 104 can thus provide helpful analytical path next-step suggestions that enable discovery of insights that would otherwise not be discoverable with older BI platforms.

The add-thread user interface area 510 can include suggested natural language prompts for the next node (here "Show the campaigns from the last two weeks," "Show user sentiment grouped by positive, negative, and neutral views," and "Show page views over the last two weeks grouped by cohort"). Any of the suggested natural language prompts can be selected. For example, the user can select the suggested natural language prompt 540: "Show user sentiment grouped by positive, negative, and neutral views." The add-thread user interface area 510 can also include a user input element 536 where a user can provide natural language input and select the add-thread user interface element 538. The modular thread analytics exploration system 104 can thus provide helpful analytical path branching suggestions that that allow discovery of insights that would otherwise not be discoverable with older BI platforms.

In FIG. 5B, the graphical user interface 500 is depicted following a user selection of a user interface element in the graphical user interface 500 of FIG. 5A. In particular, the user selects the suggested natural language prompt 540 of FIG. 5A: "Show user sentiment grouped by positive, negative, and neutral views." In response to the selection of the user interface element 540 of FIG. 5A, the graphical user interface 500 can present the second user interface element 514 based on a natural language prompt, here: "Show user sentiment grouped by positive, negative, and neutral views." As shown, the second user interface element 514 can show a placeholder visualization while the modular thread analytics exploration system processes the provided natural language prompt with the context (such as previous nodes, user inputs, any previous results, etc.) to dynamically generate the content for the second user interface element 514. For example, if at one node, a user requests "Show me data from 2023," then at a subsequent node the modular thread analytics exploration system can use the context from the previous node to filter the data and focus on data from 2023. The modular thread analytics exploration system 104 can thus provide a stateful and contextual approach to determining structured reasonings/projections from complex data.

In FIG. 5C, the graphical user interface 500 is depicted following further user selection and dynamic updates by the modular thread analytics exploration system. As shown, in the exploration area 530, a third user interface element 516 is presented with a visualization, which can be a continuation from the previous thread with the second user interface element 514 of FIG. 5B. As shown, a user can select a continue-thread user interface element 542, which can cause the graphical user interface 500 to present the continue-thread user interface area 518. The continue-thread user interface area 518 can be similar to the add-thread user interface area 510 of FIG. 5A. In the graphical user interface 500, any leaf node can be continued, which can be similar to adding a new thread from an existing node. As described herein, a data analytics exploration tree, which can be referred to as a workbook, can be saved and re-opened at a later time. As described herein, a data analytics exploration tree can be "replayed" based on updated underlying data sets. The modular thread analytics exploration system 104 can thus provide an intuitive, reproducible data analysis tool that allows users to recreate previously generated data analytics with updated data.

In some embodiments, while not illustrated, an additional user interaction with the data analytics exploration tree includes in-place modifying of a node in the data analytics exploration tree. For example, as described herein, a user can cause a node to be added to the data analytics exploration tree. The output of the node can be that an initial data set for was filtered to a subset of data. In such a case, the graphical user interface allows the user to add or remove content from the output. For example, if the output of the node is two regions, such as "New York" and "Los Angeles," then the user is able to remove one of the regions or add a third region, such as, "Chicago." Subsequent nodes in the data analytics exploration tree can then rely on the output of the current node as modified. The modular thread analytics exploration system 104 can thus provide a flexible data analytics tool that allows users to provide data in an intuitive manner.

Not necessarily all objects or advantages may be achieved in accordance with any particular embodiment described herein. Thus, certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computer hardware processors. The code modules (including computer-executable instructions) may be stored in any type of non-transitory computer-readable storage medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor ("DSP"), an ASIC, an FPGA or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, and/or elements. Thus, such conditional language is not generally intended to imply that features, and/or elements are in any way required for one or more embodiments or that one or more embodiments necessarily include logic for deciding, with or without user input or prompting, whether these features, and/or elements are included or are to be performed in any particular embodiment. The terms "comprising," "including," "having," and the like are synonymous and are used inclusively, in an open-ended fashion, and do not exclude additional elements, features, acts, operations, and so forth. Further, the term "each," as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. Unless otherwise explicitly stated, the terms "set" and "collection" should generally be interpreted to include one or more described items throughout this application. Accordingly, phrases such as "a set of devices configured to" or "a collection of devices configured to" are intended to include one or more recited devices. Such one or more recited devices can also be collectively configured to carry out the stated recitations. For example, "a set of servers configured to carry out recitations A, B and C" can include a first server configured to carry out recitation A working in conjunction with a second server configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   one or more data storage media configured to store specific computer-executable instructions; and
   one or more computer hardware processors configured to communicate with the one or more data storage media, wherein the specific computer-executable instructions are configured to cause the one or more computer hardware processors to at least:
      process natural language input, received via a graphical user interface, indicating a request to generate a solution recipe that includes a plurality of exploration steps;

generate, via a solution recipe generator, based at least in part on the natural language input, an initial solution recipe corresponding to the request, the initial solution recipe comprising the plurality of exploration steps, wherein the plurality of exploration steps, in combination, represents an analytical path configured to deduce rationales from one or more associations in a multi-dimensional database;
      the solution recipe generator is configured to generate a prompt to a first language model and to cause the first language model to output the initial solution recipe and update the initial solution recipe to a modified solution recipe; and
      cause a display of the initial solution recipe or the modified solution recipe.

2. The system of claim 1, wherein to generate the prompt, the solution recipe generator is further configured to:
   add a predefined solution recipe to a template prompt from dynamic context enrichment that results in the prompt,
      wherein the dynamic context enrichment is configured to determine the predefined solution recipe based at least in part on the natural language input, and
      wherein the modified solution recipe is based at least in part on the predefined solution recipe.

3. The system of claim 1, wherein to generate the prompt, the solution recipe generator is further configured to:
   add an analytic function to a template prompt from dynamic context enrichment that results in the prompt,
      wherein the analytic function comprises code instructions configured to be provided to the first language model,
      wherein the dynamic context enrichment is configured to determine the analytic function based at least in part on the natural language input, and
      wherein the modified solution recipe is based at least in part on the analytic function.

4. The system of claim 1, wherein further computer-executable instructions configure the one or more computer hardware processors to at least:
   generate, via a second language model, first executable code instructions based at least in part on a first exploration step from the plurality of exploration steps;
   execute the first executable code instructions in a sandbox that results in error output; and
   cause the second language model to self-debug and generate second executable code instructions based at least in part on the first exploration step and the error output, wherein to cause the display of the initial solution recipe or the modified solution recipe is based at least in part on the second executable code instructions.

5. The system of claim 1, wherein further computer-executable instructions configure the one or more computer hardware processors to at least:
   determine an evaluation guide comprising a series of questions configured to improve language model problem solving,
   wherein to generate the initial solution recipe, the solution recipe generator is configured to provide the evaluation guide to the first language model and to cause the first language model to output the initial solution recipe.

6. The system of claim 1, wherein the natural language input is not a direct query of the multi-dimensional database.

7. A computer-implemented method comprising:
   processing natural language input indicating a request to generate a solution recipe that includes a plurality of exploration steps;

generating based at least in part on the natural language input, an initial solution recipe corresponding to the request, the initial solution recipe comprising the plurality of exploration steps, wherein the plurality of exploration steps, in combination, represents an analytical path configured to deduce rationales from one or more associations in a multi-dimensional database; and causing a display of a visualization based at least in part on the initial solution recipe.

8. The computer-implemented method of claim 7, further comprising:

generating based at least in part on a first exploration step from the plurality of exploration steps, first executable code instructions associated with the analytical path, wherein causing the display of the visualization is based at least in part on execution of the first executable code instructions.

9. The computer-implemented method of claim 8, further comprising:

determining remaining exploration steps from the plurality of exploration steps without the first exploration step; and generating based at least in part on the natural language input, output from the first executable code instructions, and the remaining exploration steps, a modified solution recipe, wherein causing the display of the visualization is based at least in part on the modified solution recipe.

10. The computer-implemented method of claim 9, further comprising:

processing a second exploration step from the modified solution recipe that outputs explanatory text; and causing a display of the explanatory text.

11. The computer-implemented method of claim 8, further comprising:

executing the first executable code instructions, wherein executing the first executable code instructions results in analytic output, wherein causing the display of the visualization is based at least in part on the analytic output.

12. The computer-implemented method of claim 11, further comprising:

determining visualization code configured to cause presentation of the visualization with the analytic output, wherein causing display of the visualization comprises executing the visualization code.

13. The computer-implemented method of claim 7, further comprising:

generating based at least in part on a first exploration step from the plurality of exploration steps, first executable code instructions;

executing the first executable code instructions in a sandbox that results in error output; and generating based at least in part on the first exploration step and the error output, second executable code instructions, wherein causing the display of the visualization is based at least in part on execution of the second executable code instructions.

14. A system comprising:

one or more data storage media configured to store specific computer-executable instructions; and one or more computer hardware processors configured to communicate with the one or more data storage media, wherein the specific computer-executable instructions are configured to cause the one or more computer hardware processors to at least:

process natural language input, received via a graphical user interface, indicating a request to generate a solution recipe that includes a plurality of exploration steps;

generate, via a solution recipe generator, based at least in part on the natural language input, an initial solution recipe corresponding to the request, the initial solution recipe comprising the plurality of exploration steps, wherein the plurality of exploration steps, in combination, represents an analytical path configured to deduce rationales from one or more associations in a multi-dimensional database;

the solution recipe generator is configured to generate a prompt to a first language model and to cause the first language model to output the initial solution recipe; and cause a display of a visualization based at least in part on the initial solution recipe.

15. The system of claim 14, wherein further computer-executable instructions configure the one or more computer hardware processors to at least:

process a second exploration step from the initial solution recipe that outputs explanatory text; and cause a display of the explanatory text.

16. The system of claim 14, wherein further computer-executable instructions configure the one or more computer hardware processors to at least:

generate, via a second language model, first executable code instructions associated with the analytical path based at least in part on a first exploration step from the plurality of exploration steps, wherein to cause the display of the visualization is based at least in part on execution of the first executable code instructions.

17. The system of claim 16, wherein additional computer-executable instructions configure the one or more computer hardware processors to at least:

determine remaining exploration steps from the plurality of exploration steps without the first exploration step; and the solution recipe generator is configured to cause the first language model to update the initial solution recipe to a modified solution recipe based at least in part on the natural language input, output from the first executable code instructions, and the remaining exploration steps, wherein to cause the display of the visualization is based at least in part on the modified solution recipe.

18. The system of claim 16, wherein additional computer-executable instructions configure the one or more computer hardware processors to at least:

execute the first executable code instructions that results in analytic output, wherein to cause the display of the visualization is based at least in part on the analytic output.

19. The system of claim 18, wherein yet further computer-executable instructions configure the one or more computer hardware processors to at least:

determine visualization code configured to cause presentation of the visualization with the analytic output, wherein to cause the display of the visualization comprises, the one or more computer hardware processors execute the visualization code.

20. The system of claim 14, wherein further computer-executable instructions configure the one or more computer hardware processors to at least:

generate, via a second language model, first executable code instructions based at least in part on a first exploration step from the plurality of exploration steps;

execute the first executable code instructions in a sandbox that results in error output; and generate, via the second language model, second executable code instructions based at least in part on the first exploration step and the error output, wherein to cause the display of the visualization is based at least in part on execution of the second executable code instructions.

\* \* \* \* \*